United States Patent [19]

Kobayashi et al.

[11] Patent Number: 4,563,126
[45] Date of Patent: Jan. 7, 1986

[54] CASING OF BLOWER AND VENTILATING FAN UTILIZING THE CASING

[75] Inventors: Kazuo Kobayashi; Seijiro Asano, both of Chiba; Mituo Nakamura, Tokyo; Daijiro Ida, Narashino; Hiroshi Asabuki; Hiromoto Ashiwara, both of Funabashi, all of Japan

[73] Assignee: Hitachi, Ltd., Tokyo, Japan

[21] Appl. No.: 356,735

[22] Filed: Mar. 10, 1982

[30] Foreign Application Priority Data

| | | |
|---|---|---|
| Mar. 18, 1981 [JP] | Japan | 56-38003 |
| Apr. 24, 1981 [JP] | Japan | 56-61172 |
| Sep. 18, 1981 [JP] | Japan | 56-146227 |
| Sep. 18, 1981 [JP] | Japan | 56-146228 |
| Sep. 18, 1981 [JP] | Japan | 56-146229 |

[51] Int. Cl.⁴ .................................. F04D 29/66
[52] U.S. Cl. ........................ 415/119; 417/312; 417/350; 417/360; 417/363; 165/54; 165/7
[58] Field of Search ............... 417/312, 350, 360, 363; 415/119; 165/54

[56] References Cited

U.S. PATENT DOCUMENTS

| | | | |
|---|---|---|---|
| 3,174,682 | 3/1965 | Wilfert et al. | 415/119 |
| 3,688,867 | 9/1972 | Antonetti et al. | 417/312 |
| 3,947,148 | 3/1976 | Holt | 415/119 |

FOREIGN PATENT DOCUMENTS

1486461  9/1977  United Kingdom .............. 415/119

*Primary Examiner*—Albert W. Davis, Jr.
*Attorney, Agent, or Firm*—Antonelli, Terry & Wands

[57] ABSTRACT

A casing of a blower of the improved construction easy to assemble and low in noise level, and a ventilating fan utilizing such casing. The casing of the blower includes a frame, and spiral cases arranged in the frame and having suitable elasticity with respect to the frame, the spiral cases having external dimensions slightly larger than the internal dimensions of the frame in natural condition, so that the spiral cases can be securely held in place in the frame by the elasticity of the spiral cases themselves.

21 Claims, 27 Drawing Figures

CASING OF BLOWER AND VENTILATING FAN UTILIZING THE CASING

BACKGROUND OF THE INVENTION

1. Field of the Invention

This invention relates to a casing of a blower and, a ventilating fan utilizing such casing, and more particularly it, to a novel casing construction for making it possible to readily fabricate a blower casing which is complex in construction and complicated in production process steps because of the presence of many curved surfaces and a ventilating fan utilizing such casing construction.

2. Description of the Prior Art

It has been usual practice to produce a casing of a blower by molding a synthetic resinous material into spiral cases or making thin plates into spirial cases by thin plate working and then installing the spiral cases in a frame. The former method requires a mold for producing the spiral case which, in many cases, is very expensive. When the latter method is relied on, the spiral cases are produced in several parts, such as wind tunnel portions and flange portions, and these parts are assembled and joined together by spot welding or caulking. Thus, the latter method requires a plurality of process steps for fabricating the spiral cases. However, the spiral cases formed of synthetic resinous material or fabricated by thin plate working suffer the disadvantage that they transmit the vibration of a motor or a fan located in the vicinity thereof. And further an air current generated by operation of the blower causes resonance of the spiral cases, so that when it is desired to reduce the noise level of the ventilating fan it is necessary to use various types of vibration preventing material or reinforcing material in addition to attaching sound absorbing material to the frame. The spiral cases formed of synthetic resinous material or fabricated by thin plate working to have the aforesaid construction are assembled, in the final step, with the frame and secured thereto by screws and nuts, so that the assembling operation is a time-consuming operation.

Proposals have been made to use a method whereby spiral cases produced by using foamed synthetic resinous material and pasted to a frame or a method whereby a frame itself is utilized as a part of the mold for forming spiral cases in the frame by using foamed synthetic resinous material. However, if these methods are used, in case of the former it would be impossible to simplify the production steps and in case of the latter it would be impossible to simplify production facilities.

SUMMARY OF THE INVENTION

An object of this invention is to provide an improved casing construction for a blower and a ventilating fan utilizing such casing construction readily assembled and having a low noise level.

Another object is to provide a ventilating fan of the construction readily able to electrically and mechanically insulate electric and mechanical parts, such as a motor, a fan, etc., from the outer frame.

One of the outstanding characteristics of the invention is that the casing of the blower comprises a frame formed of a rigid material, and spiral cases arranged in the frame and having suitable elasticity with respect to the frame, with the spiral cases having, in natural condition, outer dimensions that are slightly greater than the inner dimensions of the frame, so that the spiral cases can be securely held in place in the frame by virtue of their own elasticity.

Another outstanding characteristic of the invention is that in addition to a secure holding of the spiral cases in the frame, the casing construction enables a motor for driving the fan and other parts to be held in place between the spiral cases, to thereby provide a completed ventilating fan.

In more specific terms, the spiral cases are formed of foaming synthetic resinous material that can be readily formed into the spiral cases and yet the spiral cases formed are light in weight and do not lend themselves to ready transfer of vibration.

Figure 1:
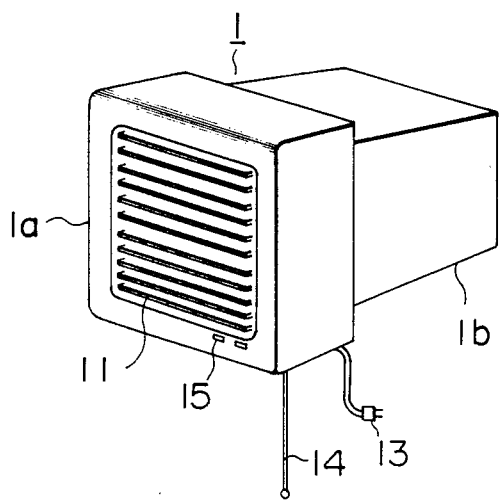
FIG. 1 is an external perspective view of the ventilating fan comprising one embodiment of the invention which is provided with a rotary type heat exchanger to simultaneously perform suction and discharge.
Figure 2:
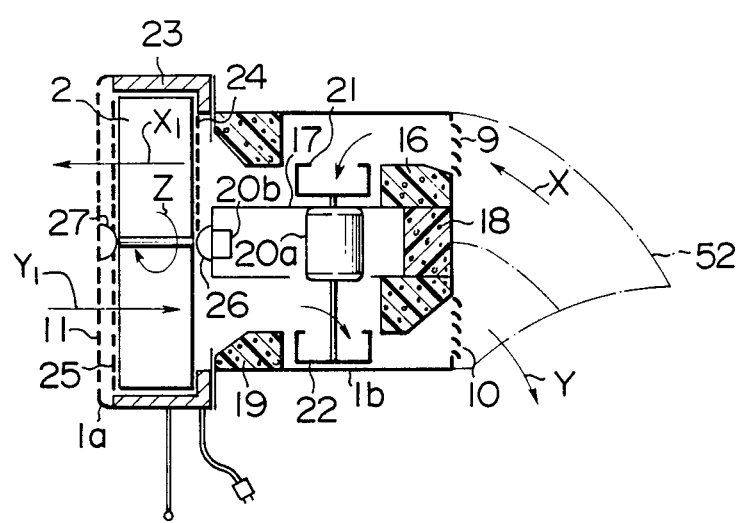
FIG. 2 is a cross sectional view of the ventilating fan of FIG. 1.

Referring now to the drawings wherein like reference numerals are used throughout the various views to designate like parts and, more particularly, to FIGS. 1 and 2, according to these figures, a ventilating fan, capable of simultaneously performing suction and discharge, includes a rotary type heat exchanger 2 arranged in straddling relation to two ventilating passages, so that ventilation can be carried out while recovery or exchange of thermal energy takes place between a suction flow and a discharge flow. An outer frame generally designated by the reference numeral 1 is composed of a front case 1a and a body case 1b. A plug 13, adapted to be inserted in a power outlet, is provided for supplying electricity to a motor 20a in the inside of the body case 1a, with a switch pull cord 14 being provided for starting and stopping the motor 20a, a pilot lamp 15 for indicating the operating condition of the ventilating fan. A suction and discharge port 11 on the indoor side is formed in the front case 1a.

As shown in FIG. 2, a first spiral case 16, a motor mounting frame 17, an intermediate case 18 and a second spiral case 19 are arranged in superposed relation in the body case 1b. The motor mounting frame 17 supports the motor 20a of the double shaft construction and a gear motor 20b. A first fan 21 and a second fan 22 are mounted on the ends of two shafts of the motor 20a. The front case 1a contains a rotor case 23 and the rotary type heat exchanger 2 connected to the gear motor 20b. The rotary type heat exchanger 2 has a first filter 24 and a second filter 25 located in the rear and in the front thereof, respectively, and also has air seals 26 and 27 installed in the rear and in the front thereof, respectively, to separate two air currents respectively designated by the arrows X and Y from each other that flow through the heat exchanger 2 in opposite directions. In the ventilating fan of this construction, actuation of the motors 20a and 20b causes the rotary type heat exchanger 2 to begin to slowly rotate in the direction of an arrow Z. The outdoor air drawn by suction through a suction port 9, formed in the rear of the body case 1b, by rotation of the first fan 21 is introduced into the room in the direction of an arrow $X_1$ through the first filter 24, rotary type heat exchanger 2, second filter 25, and the suction and discharge port 11 formed in the front of the front case 1a. At the same time, rotation of the second fan 22 draws indoor air in the direction of the arrow $Y_1$ by suction through the suction and discharge port 11 of the front case 1a, second filter 25, and rotary type heat exchanger 2 into the second rotary case 19 from which the indoor air is discharged through a discharge port 10 formed in the rear of the body case 1b in the direction of the arrow Y. As operation of the ventilating fan continues, heat exchange takes place between the outdoor air current X and the indoor air current Y through the rotary type heat exchanger 2, to thereby reduce the load applied to the indoor facilities of an air-conditioning system.

Figure 3:
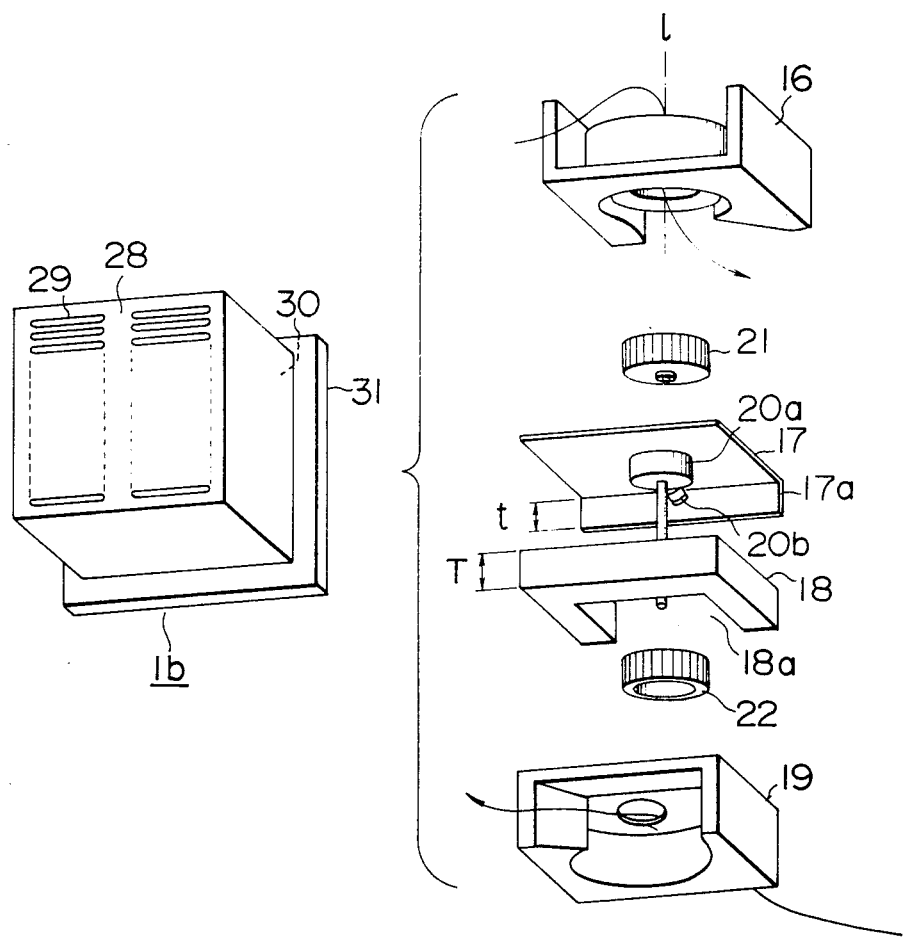
FIG. 3 is an exploded perspective view of the parts of the ventilating fan for performing simultaneous suction and discharge.
Figure 4:
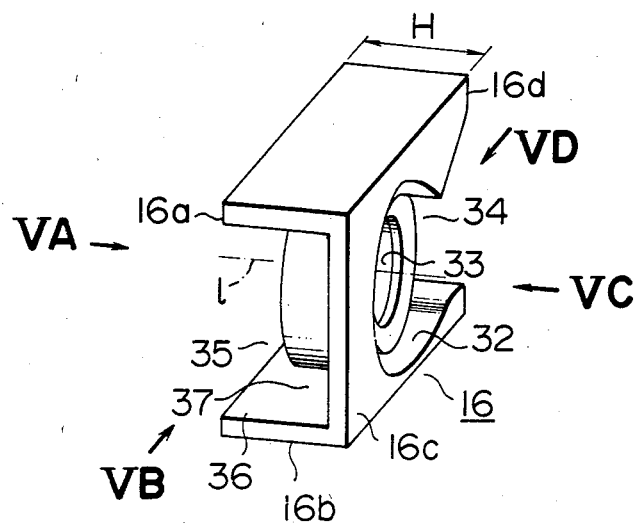
FIG. 4 is a perspective view of the spiral case constituting a blower.
Figure 5A:
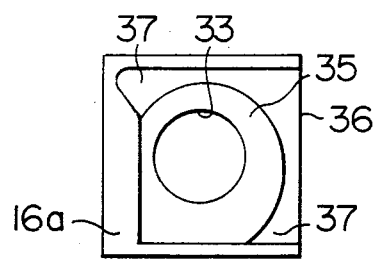
FIGS. 5A, 5B, 5C and 5D are views showing surfaces as viewed in the direction of arrows VA, VB, VC and VD in FIG. 4, respectively.
Figure 5B:
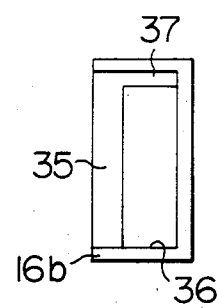
Figure 5C:
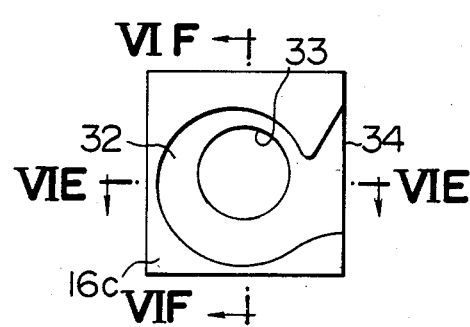
Figure 5D:
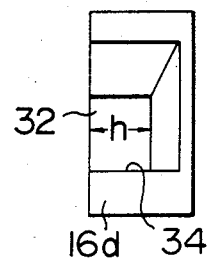
Figure 6E:
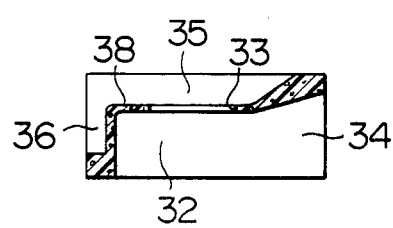
FIGS. 6E and 6F are sectional views taken along the lines VIE—VIE and VIF—VIF, respectively, in FIG. 5C.
Figure 6F:
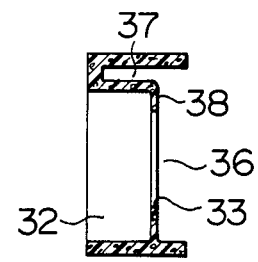

As shown in FIG. 3, the body case 1b is in the form of a box open at the front and formed at its back 28 with a plurality of ventilating apertures 29. The ventilating apertures 29 are equally divided into two groups, with one group consisting of the apertures in the upper half area serving as outdoor air suction ports and the other group consisting of the apertures in the lower half area serving as indoor air discharge ports. The body case 1b is formed at a front opening 30 with a flange 31 for connection with the front case 1a. The body case 1b contains therein a stack of parts inserted through the opening 30 and installed therein, such stack of parts including the motor mounting frame 17 held between the first spiral case 16, intermediate case 18 and second spiral case 19. More specifically, the motor mounting frame 17 comprises a plate bent at one end portion in the form of a letter L in cross section and has the motor 20a supported substantially in the central portion thereof in such a manner that the motor 20a has its body disposed on the side of the frame 17 in which the bent portion 17a is directed and the longer shaft of the motor 20a is disposed on the side in which the bent portion 17a is directed and the shorter shaft thereof is disposed on the side in which the bent portion 17a is not directed. The bent portion 17a of the frame 17 supports, in the central portion thereof, the gear motor 20b for driving the rotary type heat exchanger 2 in such a manner that its output shaft is directed outwardly of the motor mounting frame 17. Although not shown, the motor mounting frame 17 can additionally support a phase advancing capacitor for driving the motor 20a and other electric parts. The intermediate case 18 is substantially in the form of a letter U in a lying position and includes an opening 18a formed on a side thereof which faces the inside of the bent portion 17a of the frame 17. The intermediate case 18 has a thickness T which is equal to or slightly larger than the height t of the inside of the bent portion 17a.

As shown in FIGS. 4, 5A–5D, 6E and 6F, the spiral case 16 has formed, in the center of its front surface 16C a spiral case 32 which, in turn, has, in its center area, an air passage 33 formed therein communicating with a rear surface 16a. The spiral case 16 is formed on one side 16d thereof with a discharge port 34 communicating with the spiral space 32 and, on a side 16b thereof opposite the side 16d, a suction port 36 communicating with a space 35 at the back of the spiral space 32. More specifically, the spiral space 32 has a height h (FIG. 5d) which is smaller than the thickness H (FIG. 4) of the spiral case 16 to enable the space 35 to be formed at the back of the space 32 on the side of a rear surface 16a of the spiral case 16. By providing a partition wall 38 (FIGS. 6E, 6F) of a suitable thickness that partitions the spiral case 32, it is possible to increase the size of the space 35 at the back of the spiral space 32 to provide a passage 37 to the rear surface side which has ample space. The second spiral case 19 is constructed such that it is obtained by rotating the first spiral case 16 through 180 degrees about the axis 1 of the spiral (See FIG. 3). Stated differently, the first spiral case 16 and the second spiral case 19 are identical in construction except that they are rotated through 180 degrees about the axis 1 of the spiral when installed.

Assembling of the parts in the body case 1b will be described in sequence by referring to FIG. 3. The motor 20a and gear motor 20b are first mounted on the motor mounting frame 17, and the first fan 21 is attached to the end of the short shaft of the motor 20a. The first spiral case 16 and intermediate case 18 are stacked or mounted one over the other, with the motor mounting frame 17 being interposed therebetween, and the second spiral case 19 is stacked or mounted on the intermediate case 18 at its outer side. The second fan 22 is attached to the end of the long shaft of the motor 20a. The first and second fans 21 and 22 are identical with each other except that they are mounted on different sides of the motor mounting frame 17. Finally, the parts held between the two spiral cases 16 and 19 are inserted in the body 1b through the opening 30.

Figure 7:
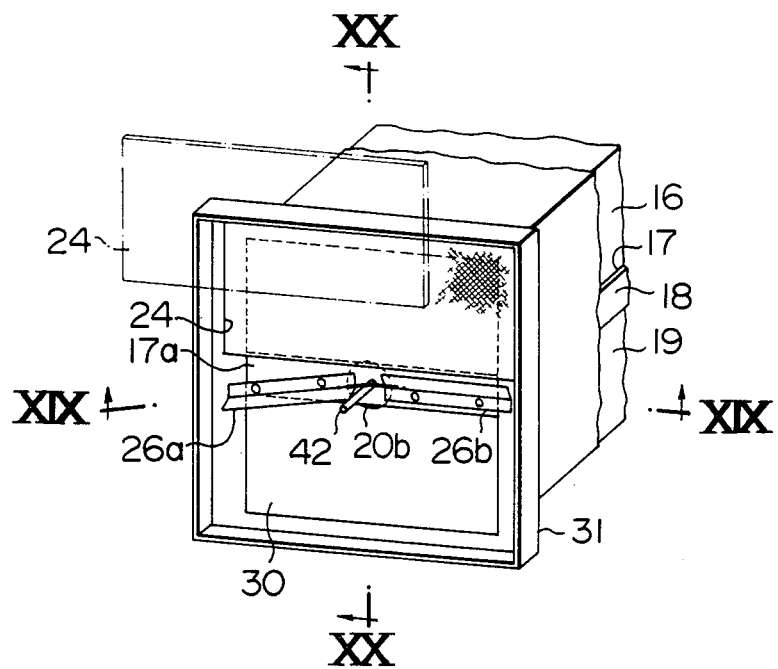
FIG. 7 is an exploded perspective view of the body case of the ventilating fan, showing its construction in an vicinity of the opening thereof.
Figure 8:
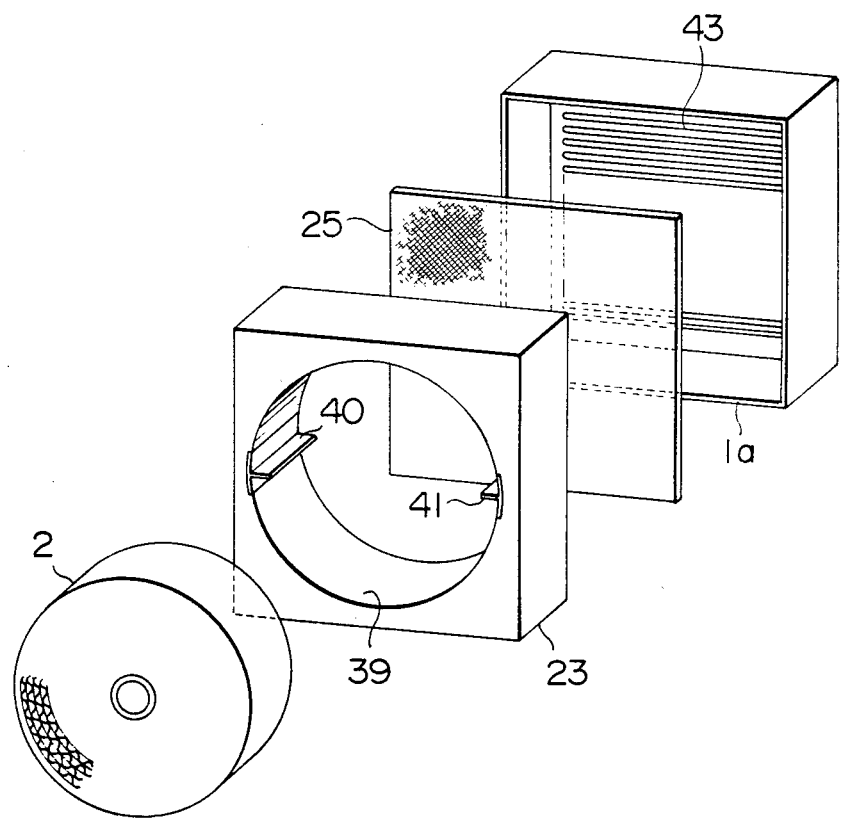
FIG. 8 is an exploded perspective view of the front case portion of the ventilating fan for installing therein the rotary type heat exchanger.
Figure 9:
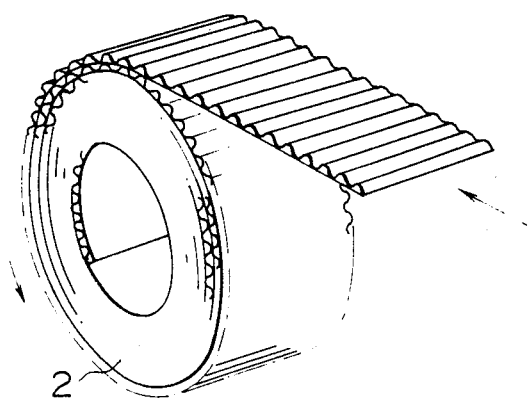
in FIG. 9 is a view in explanation of the process for producing the rotary type heat exchanger.

After the spiral cases 16 and 19 and other parts are assembled in the body case 1b, as shown in FIGS. 7 and 8, the first filter 24 and air seals 26a and 26b are arranged inside the flange 31 of the body case 1b. More specifically, the first filter 24 is secured in the flange 31 so as to cover the discharge port 34 of the first spiral case 16. The air seals 26a and 26b, of known construction, as viewed in the direction of rotation of the rotary type heat exchanger 2, are mounted on the bent portion 17a of the motor mounting frame 17. Then a rotor case 23 is arranged in the flange 31. The rotor case 23 includes a rotor housing 39 formed by providing a cylindrical space in the center and having air seals 40 and 41, of a known construction, arranged on the inner side thereof to partition the side surface of the rotary type heat exchanger 2 installed therein into upper and lower portions. Then the rotary type heat exchanger 2, of a known construction, formed, for example, by winding a strip of paper, corrugated cardboard or pulp as shown in FIG. 9, is arranged in the rotor housing 39 and connected to a shaft 42 of the gear motor 20b. Then the second filter 25 is arranged on the front surface side of the rotor case 23, and finally the front case 1a is fitted over the rotor case 23 and secured to the flange 31 of the body case 1b, thereby completing assembling of the air-conditioning ventilating fan. The front case 1a is formed at its front surface with a plurality of ventilating openings 43 to constitute the suction and discharge port 11. The ventilating openings 43 are divided into two equal groups, with one group in the upper portion serving as the outdoor air discharge port and the other in the lower portion serving as the indoor air suction port. Air seals, of known construction, may be arranged on the inner side of the second filter 25 in a manner so as to face the end surface of the rotary type heat exchanger 2, to thereby completely partition the suction and discharge air passage into two separate channels.

Figure 10:
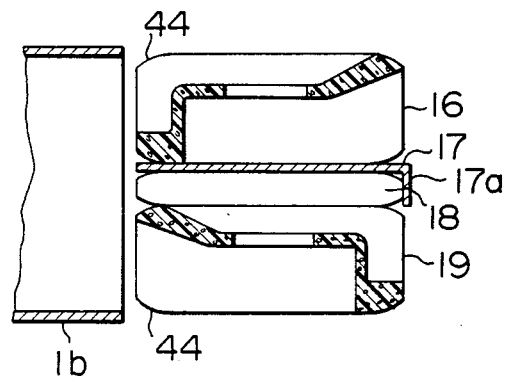
FIG. 10 is a cross sectional view of the body case portion of the ventilating fan comprising another of the invention.

In the embodiment described hereinabove, the first spiral case 16, intermediate case 18, second spiral case 19 and rotor case 23 are advantageously formed of a foamed synthetic resinous material. When they are formed of a foamed synthetic resinous material, the first spiral case 16, motor mounting frame 17, intermediate case 18 and second spiral case 19 advantageously have, when they are stacked or mounted, dimensions which are slightly larger than the inner dimensions of the body case 1b for housing them. More specifically, the foamed synthetic resinous material is slightly elastic and the motor mounting frame 17, held between the spiral cases of this material, can be positively held in place in the body case 1b. In this case, as shown in FIG. 10, by forming bevelled corners 44 on the front surface 16c or rear surface 16a of the first and second spiral cases 16 and 19, it is possible to more positively bring the body case 1b, motor mounting frame 17, intermediate case 18 and first and second spiral cases 16 and 19 into intimate contact with one another and to provide an improved air seal to the assembly, because the bevelled corners 44 make the surfaces more susceptible to elastic deformation. Also, the provision of the bevelled corners 44 makes it possible to more readily insert the stack of first and second spiral cases 16 and 19 into the body case 1b.

When the spiral cases 16, 19 are formed of a foamed synthetic resinous material, it is possible to produce them with ease by using a mold, and the spiral cases 16, 19 thus produced are light in weight and highly resistant to vibration and noise, making it possible to produce a ventilating fan light in weight and, for example, readily installed on the wall surface, due to the fact that foamed synthetic resinous material has a certain degree of elasticity, positioning and fixing in place of the motor mounting frame 17 interposed between the spiral cases 16, 19 formed of this material can be effected by utilizing the elasticity of the synthetic resinous material if the dimensions of the spiral cases 16, 19 or the intermediate case 18 are selected in such a manner that, when the parts assembled in the body case 1b are stacked, the thickness of the stack is slightly larger than the inner dimensions of the body case 1b. Thus, the motor mounting frame 17 can be readily installed in the body case 1b and screws or other fixing means can be eliminated in some cases. The elasticity of the foamed synthetic resinous material makes it relatively difficult to transmit the vibration of the motors 20a, 20b and the noise of the fans to the outside of the body case, thereby making it possible to produce a ventilating fan of low noise level.

By securing the bent portion 17a of the motor mountingframe 17 to the flange 31 of the body case 1b, it is possible to positively avoid dislodging of the first and second spiral cases 16 and 19.

Figure 11:
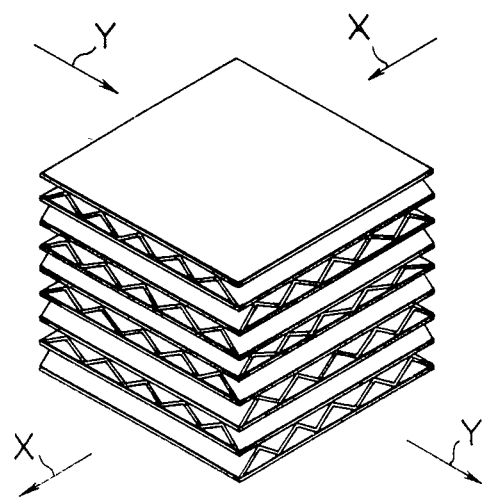
FIG. 11 is a perspective view of the cross flow heat exchanger.
Figure 12:
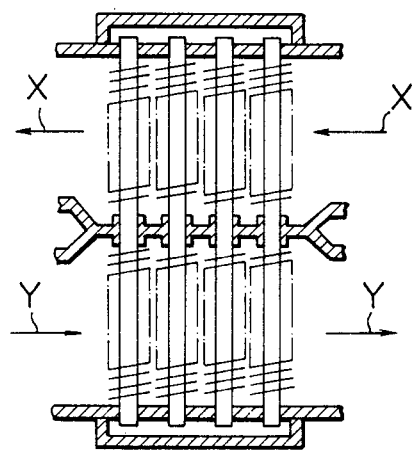
FIG. 12 is a cross sectional view of a heat pipe type heat exchanger.
Figure 13:
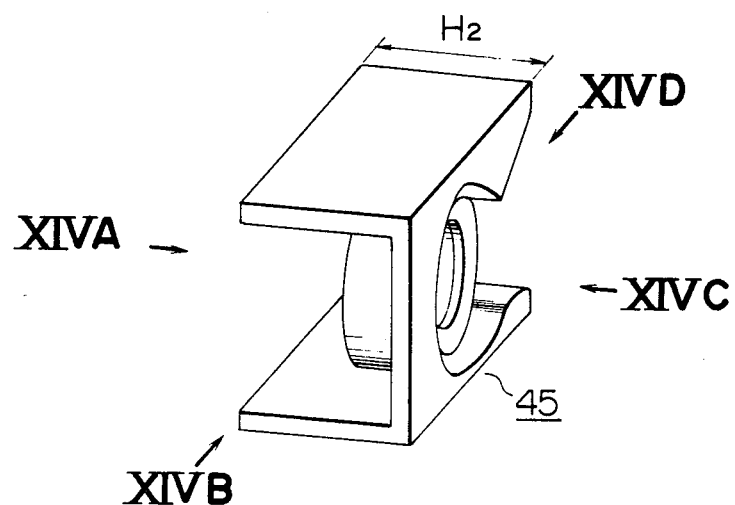
FIG. 13 is a perspective view of the spiral case used in another of the present invention.
Figure 14A:
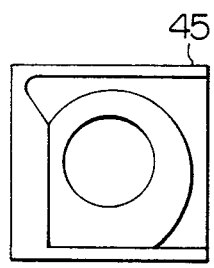
FIGS. 14A, 14B, 14C and 14D are views showing surfaces as viewed in the direction of arrows XIVA, XIVB, XIVC and XIVD in FIG. 13, respectively.
Figure 14B:
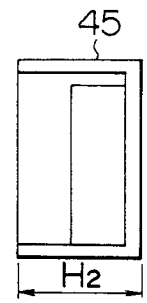
Figure 14C:
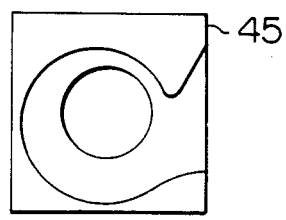
Figure 14D:
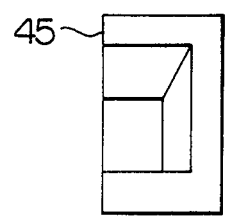

In the embodiment described hereinabove, a rotary type total heat exchanger may be used as the rotary type heat exchanger 2. In addition, a cross flow heat exchanger, of known construction shown in FIG. 11, or a heat pipe type heat exchanger, of known construction shown in FIG. 12, may be mounted in straddling relation to the discharge port 34 and suction port 36 of the first and second spiral cases 16 and 19.

In the foregoing description, the first spiral case 16 has been described as being rotated through 180 degrees to obtain the second spiral case 19 and these two spiral cases have been assembled with the intermediate case 18. The invention is not limited to this arrangement and two types of spiral cases 16, 19 may be used without utilizing an intermediate case 18 to provide a ventilating fan of the simultaneous air suction and discharge type. More particularly, as shown in FIGS. 13 and 14a-14d, a second spiral case 45 may be used, with the second spiral case 45 having a thickness $H_2$ which is larger than the thickness H of the second spiral case 19 by an amount equal to the height (the thickness of the intermediate case 18) of the motor 20a. By this arrangement, it is possible to assemble the motor mounting frame 17 in the body case 1b by holding the frame 17 between the first spiral case 16 and second spiral case 45. This example facilitates assembling of the ventilating fan. In any event, when the second spiral case 45 is used, an air-conditioning ventilating fan can be produced by using the same number of types of parts as the embodiment shown and described by referring to FIGS. 1-12.

Figure 15:
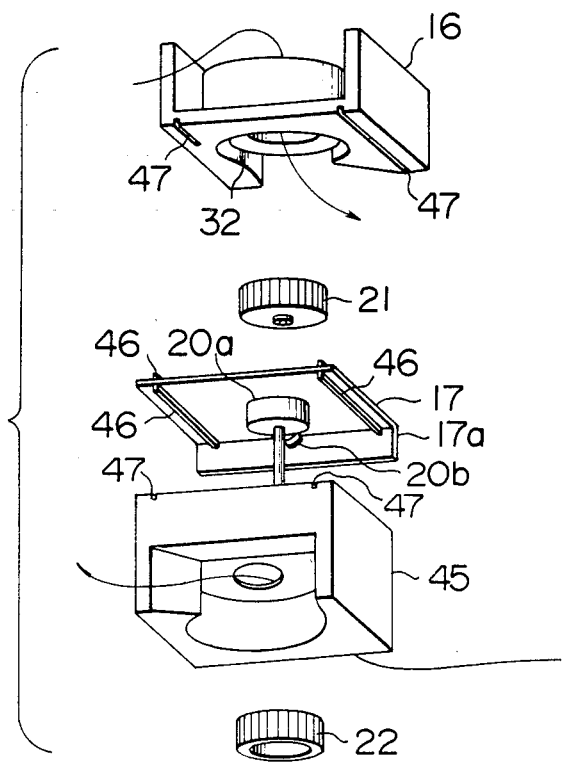
FIG. 15 is an exploded perspective view of still another embodiment in accordance with the present invention.
Figure 16:
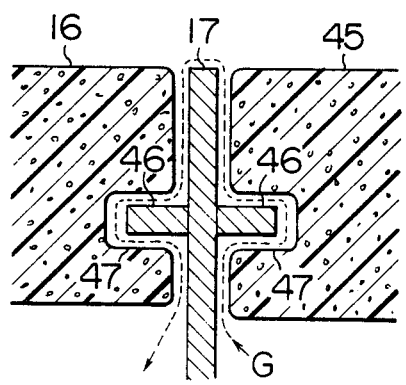
FIG. 16 is a cross sectional view depicting air current leaks.

In the embodiment of FIGS. 15 and 16, the motor mounting frame 17 includes a plurality of parallel ridges 46 on opposite sides of the frame 17 to increase the surface area of the frame 17, to thereby avoid mixing of the suction current and discharge current with each other through the surface of the frame 17. More specifically, plates of a suitable height are selected and joined by, for example, welding to the motor mounting frame 17 to provide the parallel ridges 46. It is necessary that the parallel ridges 46 be located by avoiding the space 32 in the first spiral case 16, and that the first and second spiral cases 16 and 19 adjacent the motor mounting frame 17 be formed with grooves 47 for the parallel ridges 46 to be engaged therein. By assembling the parts as shown in FIG. 16 after suitably selecting the height and depth of the parallel ridges 46 and grooves 47 respectively, it is possible to avoid leaking of the suction current and discharge current and mixing thereof which might otherwise occur as indicated by an arrow G through the motor mounting frame 17. More specifically, when the spiral cases 16 and 45 are formed of a foamed synthetic resinous material, assembling of the parts can be effected by utilizing the elastic deformation of the spiral cases 16 and 45. Therefore, the height of the parallel ridges 46 is advantageously selected to be slightly larger than the depth of the grooves 47. By this arrangement, a complete seal can be provided between the motor mounting frame 17 and the spiral cases 16 and 45 because the parallel ridges 46 are brought into intimate contact at the top with the grooves 47 at the bottom.

The provision of the parallel ridges 46 to the motor mounting frame 17 not only increases the sealing effect, but also facilitates positioning of the motor mounting frame 17 with respect to the spiral cases 16 and 45 or holding in place of partly assembled parts when assembling of the parts is carried out. In the foregoing description, two spiral cases 16 and 45 have been described as being used. However, aforesaid embodiment can be used for the ventilating fan using the intermediate case 18. In this situation, the intermediate case 18 should be formed with grooves 47 on a surface thereof facing the motor mounting frame 17 to receive the parallel ridges 46 therein.

Figure 17:
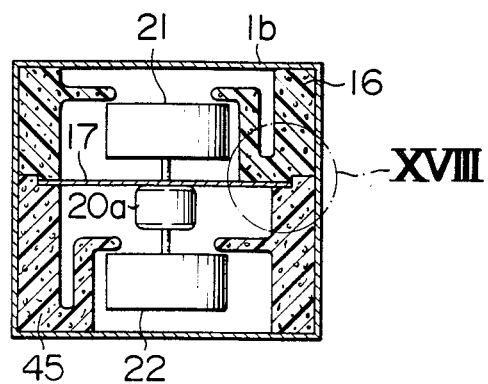
FIG. 17 is a cross sectional view of the body case portion, in explanation of the construction of the ventilating fan comprising still another embodiment of the present invention.
Figure 18:
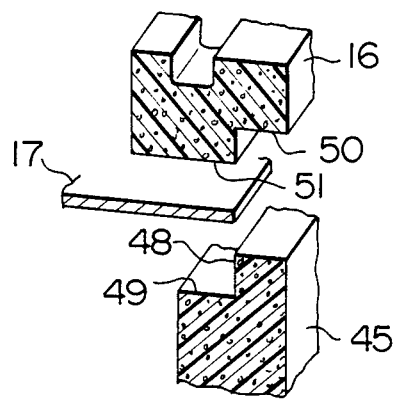
FIG. 18 is a fragmentary exploded perspective view showing, on an enlarged scale, the portion XVIII of the body case portion shown in FIG. 17.

In the embodiment of FIGS. 17, 18 the motor mounting frame 17 has smaller outer dimensions than the spiral cases 16 and 45, and the motor mounting frame 17 is kept from contacting the body case 1b. As shown in FIGS. 17 and 18, the second spiral case 45 is provided with an outer wall 48 by forming a cutout 49 on a side thereof facing the motor mounting frame 17, and the first spiral case 16 is provided with a projection 51 by forming a cutout 50 on a side thereof facing the motor mounting frame 17. In assembling, the motor mounting frame 17 is placed on the second spiral case 45 and engages the cutout 49, and the first spiral case 16 is placed on the motor mounting frame 17 and second spiral case 45 in such a manner that the projection 51 engages the frame 17 and the cutout 49. By assembling the parts in this way, it is possible to hold the motor mounting frame 17 between the first and second spiral cases 16 and 45 and then insert the assembly into the body case 1b. When the first and second spiral cases 16 and 45 are formed of a foaming synthetic resinous material, it is possible to avoid accidents involving electric shock without grounding the body of the ventilating fan because the foaming synthetic resinous material is an insulator.

While the embodiment shown in FIGS. 17 and 18 comprises the first spiral case 16 and the second spiral case 45 in the ventilating fan, it is to be understood that the intermediate case 18 may be used in this embodiment. When this is the case, the first spiral case 16 and the intermediate case 18 positioned against each other are formed with various cutouts to leave outer wall so that the motor mounting frame 17 can be held in place while being held between the first spiral case 16 and the intermediate case 18 in enclosing relation.

In all of the embodiments described hereinabove, a weather cover 52, as shown in FIG. 2, may be attached to the body case 1b of the ventilating fan simultaneously performing suction and discharge, to prevent introduction of rain and snow through the discharge port 9 and suction port 10. Also, to facilitate assembling of the first spiral case 16, motor mounting frame 17, intermediate case 18 and second spiral case 19 or 45, these component parts may be formed on surfaces thereof which are brought into contact with each other with projections and openings or recesses for engaging the projections.

In the embodiments described hereinabove of the ventilating fan provided with a rotary type heat exchanger 2 for carrying out suction and discharge simultaneously, the air seals 26a and 26b do not extend to the vicinity of the shaft 42 of the gear motor 20b for driving the rotary type heat exchanger 2. This might cause mixing of the suction current X and the discharge current Y with each other near the shaft 42. When this phenomenon occurs, heat-exchange efficiency of the rotary type heat exchanger 2 would be reduced and ventilating efficiency of the fan would also be reduced. To compensate for this phenomenon, as, shown in FIGS. 19 and 20, a cylindrical shield wall is mounted between the end face of the rotary type heat exchanger 2 and the bent portion 17a of the motor mounting frame 17 in such a manner that it faces the outer peripheral cylindrical surface or inner peripheral cylindrical surface of a bobbin of the heat exchanger 2, to thereby avoid leaks or mixing of the air currents X, Y.

Figure 19:
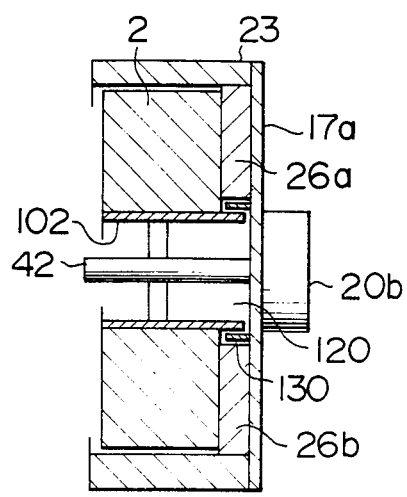
FIG. 19 is a cross sectional view taken along the line XIX—XIX in FIG. 7, showing the rotational drive portion of the rotary type heat exchanger installed in the ventilating fan.

In the embodiment shown in FIG. 19, the cylindrical shield wall 130 is mounted in a manner to surround the outer peripheral cylindrical surface of the bobbin 102 of the rotary type heat exchanger 2 extending from the end face of the heat exchanger 2 at one end thereof, and is attached to the bent portion 17a of the motor mounting frame 17. When the clearance between the outer peripheral cylindrical surface of the bobbin 102 and the inner peripheral cylindrical surface of the shield wall 130 is minimized in this arrangement, the resistance offered to the flow of air by this section increases. Thus, it is possible to avoid mixing of the suction current X and the discharge current Y with each other through a hollow space 120 formed in the bobbin 102.

Figure 20:
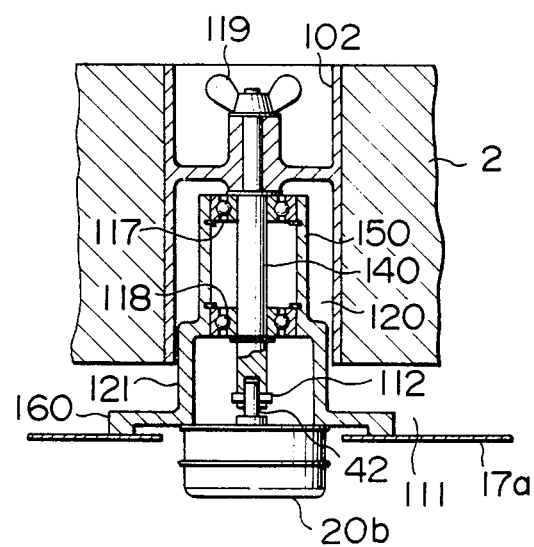
FIG. 20 is a cross sectional view taken along the line XX—XX in FIG. 7, showing the rotational drive portion of the rotary type heat exchanger installed in the ventilating fan.

In FIG. 20, an intermediate shaft 140, supported by an intermediate shaft support member 150, is provided to connect the rotary type heat exchanger 2 to the gear motor 20b to avoid the weight of the heat exchanger 2 being directly borne by the gear motor 20b. The outer peripheral cylindrical surface of the intermediate shaft support member 150 is utilized to serve the purpose of the shield wall 130 described in connection with FIG. 19. More specifically, the intermediate shaft support member 150 is in the form of a hollow cylinder formed at one end with a flange 160 for securing in place the bent portion 17a of the motor mounting frame 17. The intermediate shaft 140 is rotatably supported by the intermediate shaft support member 150 through bearings 117 and 118 and threaded at one end for threadably attaching a butterfly nut 119 for securing the bobbin 102 in place while the other end of the shaft 140 is hollow and formed with axial grooves for engaging the shaft 42 of the gear motor 20b. A pin 112, attached to the end of the drive shaft 42 of the gear motor 20b, is engaged in the hollow and grooves portion of the intermediate shaft 140. The gear motor 20b is mounted on the bent portion 17a of the motor mounting frame 17 or the flange 160 of the intermediate shaft support member 150. When the diameter of the intermediate shaft support member 150 is increased in a vicinity of the bent portion 17a and the outer peripheral cylindrical surface 112 is moved toward the inner peripheral cylindrical surface of the bobbin 102 to minimize the clearance therebetween in the aforesaid arrangement, the resistance offered to the flow of air by this section increases, so that it is possible to avoid mixing of the suction current X and the discharge current Y with each other through the hollow space 120 of the bobbin 102. This construction permits the space 120 in the bobbin 102 to be fully utilized. That is, the bearings 117 and 118 for bearing the weight of the rotary type heat exchanger 2 can be arranged in the space 120 in the bobbin 102 and the volume of the space 120 formed in the bobbin 102 can be reduced, so that the resistance offered to the flow of air by this section increases and prevents air from leaking therethrough. The air seals 26a and 26b described hereinabove are mounted in a space 111.

What is claimed is:

1. A casing of a blower comprising:
  a frame formed of rigid material; and
  a plurality of spiral cases arranged in said frame, said spiral cases being formed of a material having suitable elasticity with respect to the frame and having outer dimensions slightly larger in their natural unassembled condition than the inner dimensions of the frame whereby the spiral cases are compressed as arranged in their assembled condition in said frame so that the spiral cases can be held in place in the frame by virtue of their own elasticity.

2. A casing as claimed in claim 1, wherein each of the spiral cases are provided with bevelled corners on at least one of a front and rear surface thereof so as to ensure a more positive intimate engagement between the frame and the spiral cases.

3. A casing of a blower comprising:
  a frame formed of rigid material having an opening at least one end thereof; and
  a plurality of spiral cases arranged in said frame, said spiral cases being formed of a material having suitable elasticity with respect to the frame and having outer dimensions slightly larger in natural unassembled condition than the dimensions of the opening of the frame whereby the spiral cases are compressed as arranged in their assembled condition in said frame so that the spiral cases can be held in place in the frame by virtue of their own elasticity.

4. A casing as claimed in claim 3, wherein said spiral cases are formed of foamed synthetic resinous material.

5. A ventilating fan comprising:
  a motor mounting frame and a fan driving motor mounted on said frame;
  a plurality of spiral cases arranged in a manner to hold said motor mounting frame with motor therebetween;
  fans arranged in said spiral cases and connected to rotary shafts of said motor;
  a frame of predetermined strength for holding said spiral cases in predetermined relationship; and wherein said spiral cases are formed of a material of suitable elasticity with respect to the frame and are arranged in a compressed condition within said frame so as to elastically support said motor mounting frame with motor and effecting positioning of said frame and motor with respect to at least one direction.

6. A ventilating fan as claimed in claim 5, wherein said frame has inner dimensions smaller than the outer dimensions of said motor mounting frame and said spiral cases stacked in their natural unassembled condition so that when the motor mounting frame and the spiral cases are held in their assembled condition in the frame, the motor mounting frame, the spiral cases and the frame are brought into pressing contact with each other.

7. A ventilating fan as claimed in one of claims 5 or 6, wherein said spiral cases are formed of a foamed synthetic resinous material.

8. A ventilating fan as claimed in claim 5, wherein said spiral cases are in surface-to-surface contact with the inner surfaces of the frame.

9. A ventilating fan as claimed in claim 8, wherein said spiral cases have larger outer dimensions than said motor.

10. A ventilating fan according to claim 5, wherein each of the spiral cases are provided with bevelled corners on at least one of a front and rear surface thereof so as to ensure a more positive intimate engagement between the frame and the spiral cases.

11. A ventilating fan capable of performing suction and discharge of air simultaneously comprising:
  a body case formed of a rigid material;
  a first spiral case, an intermediate case and a second spiral case held in said body case in superposed stacked relation, at least one of said three cases being suitably elastic with respect to said body and being in a compressed condition within said body case;
  a motor mounting frame elastically supported in the body case by means of the elasticity of said at least one compressed elastic case while being held between said first spiral case and said intermediate case or between said intermediate case and said second spiral case;
  a motor mounted on said motor mounting frame; and
  a first fan and a second fan connected to rotary shafts of said motor and arranged in said first spiral case and said second spiral case respectively.

12. A ventilating fan capable of performing suction and discharge of air simultaneously as claimed in claim 11, wherein said body case has inner dimensions smaller than the dimensions of said first spiral case, said second spiral case, said intermediate case and said motor mounting frame held in superposed stacked relation in natural unassembled condition so that when the first and second spiral cases, the intermediate case and the motor mounting frame are arranged in their assembled condition in the body case, the inner surface of the body case, the first and second spiral cases, the intermediate case and the motor mounting fan are brought into pressing contact with each other.

13. A ventilating fan capable of performing suction and discharge of air simultaneously as claimed in one of claims 11 or 12, wherein at least one of said first and second spiral cases and said intermediate case is formed of a foamed synthetic resinous material.

14. A ventilating fan capable of performing suction and discharge of air simultaneously as claimed in 11, wherein said first spiral case includes a spiral space formed on the front surface side, a discharge port opening at one of side surfaces and communicating with said spiral space, an air passage formed on the rear surface side and communicating with the central portion of said spiral space, and a suction port formed at a side surface opposite said side surface at which said discharge port is formed and communicating with said air passage, and said second spiral case is identical in construction with said first spiral case and arranged symmetrically therewith with respect to the axis of the spiral.

15. A ventilating fan capable of performing suction and discharge of air simultaneously as claimed in claim 13, wherein said motor mounting frame has ridges located on opposite sides thereof.

16. A ventilating fan capable of performing suction and discharge of air simultaneously as claimed in claim 11, whereas said motor mounting frame is formed of a plate of outer dimensions smaller than those of the first and second spiral cases and the intermediate case.

17. A ventilating fan according to claim 11, wherein each of the first spiral case and the second spiral case is formed with a suction port and a discharge port, which are arranged such that when the cases are superposed in stacked relation, the suction ports and the discharge ports open in the same directions, respectively.

18. A ventilating fan according to claim 11, wherein each motor mounting frame is L-shaped in cross section and is so disposed in the body case that the bent short side portion of the L-shaped frame faces toward an opening side of the body case, said motor being mounted on the long side portion of the frame while a gear motor is mounted on the short side portion thereof.

19. A ventilating fan according to claim 11, wherein said intermediate case has a thickness substantially equal to or slightly larger than the height of said motor.

20. A ventilating fan according to claim 11, wherein said motor mounting frame also serves as a partition for isolating air passages defined by respective spiral cases from each other.

21. A ventilating fan according to claim 11, wherein said motor is a nonsymmetrical type motor having two shafts.

* * * * *